United States Patent
Kim

(10) Patent No.: US 6,330,150 B1
(45) Date of Patent: Dec. 11, 2001

(54) SYSTEM FOR EXCHANGING LAMP OF LCD

(75) Inventor: Soon-Dong Kim, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/613,139

(22) Filed: Jul. 10, 2000

(30) Foreign Application Priority Data

Nov. 2, 1999 (KR) .................................................. 99-48167

(51) Int. Cl.$^7$ ........................................................ H05K 5/00
(52) U.S. Cl. .................. 361/683; 361/681; 361/753; 349/58; 349/65; 362/31
(58) Field of Search .................................. 361/681–685, 361/825, 752, 753; 349/58, 59, 65; 362/31

(56) References Cited

U.S. PATENT DOCUMENTS

| | | | |
|---|---|---|---|
| 5,280,372 | * | 1/1994 | Horiuchi .................................. 359/49 |
| 5,334,993 | * | 8/1994 | Okajima et al. ....................... 345/102 |
| 5,422,751 | * | 6/1995 | Lewis et al. ............................. 359/83 |
| 5,870,156 | * | 2/1999 | Heembrock ............................. 349/64 |
| 6,130,658 | * | 10/2000 | Yamamoto et al. .................. 345/102 |
| 6,175,396 | * | 1/2001 | Kim et al. ............................... 349/59 |

FOREIGN PATENT DOCUMENTS

| | | |
|---|---|---|
| 6-273765 | 9/1994 | (JP) . |
| 8-43816 | 2/1996 | (JP) . |
| 8-211389 | 8/1996 | (JP) . |
| 9-5744 | 1/1997 | (JP) . |
| 11-52368 | 2/1999 | (JP) . |

* cited by examiner

Primary Examiner—Jeffrey Gaffin
Assistant Examiner—Tuan Dinh
(74) Attorney, Agent, or Firm—Robert E. Bushnell, Esq.

(57) ABSTRACT

The liquid crystal display (LCD) apparatus capable of easily exchanging the lamp is disclosed in the present invention. The liquid crystal display apparatus according to the present invention includes a printed circuit board (PCB), a liquid crystal display panel electrically connected with the printed circuit board for thereby displaying a certain character or symbol and having at least one rectangular hole inwardly formed at a lateral surface of the same, a lamp detachably engaged to the rectangular hole of the liquid crystal display panel for emitting light on a screen of the liquid crystal display panel, a panel bracket for integrally fixing the liquid crystal display panel and the printed circuit board, and a cover tiltably engaged at a rim portion of the panel bracket and tilted in the forward and backward directions by a tilting member for thereby opening and closing the rectangular hole of the liquid crystal display panel when the liquid crystal display panel is integrally engaged to the panel bracket, whereby it is possible to easily exchange the lamp by tilting the cover in the forward and backward directions.

20 Claims, 5 Drawing Sheets

SYSTEM FOR EXCHANGING LAMP OF LCD

CLAIM OF PRIORITY

This application makes reference to, incorporates the same herein, and claims all benefits accruing under 35 U.S.C. §119 from an application entitled SYSTEM FOR EXCHANGING LAMPS OF LCD earlier filed in the Korean Industrial Property Office on Nov. 2, 1999, and there duly assigned SerialNo. 48167/1999, a copy of which is annexed hereto.

BACKGROUND OF THE INVENTION

1. Technical Field

The present invention relates to a system for exchanging a lamp of a liquid crystal display (LCD) apparatus, and in particular to a system for exchanging a lamp of a liquid crystal display apparatus which is capable of easily exchanging a lamp by improving the constructions of a liquid crystal display panel and a panel bracket.

2. Related Art

Generally, a liquid crystal display (LCD) monitor is directed to a display apparatus which is capable of displaying a certain character or symbol based on an optical characteristic by changing a molecular arrangement by applying a voltage to the liquid crystal display.

Since a size of a liquid crystal display monitor may be small, the liquid crystal display monitor can be adapted to a major electronic appliance such as a portable television, a portable computer, a video camera, and the like. A liquid crystal display monitor can be classified into an active type display and a passive type display based on whether a back light unit which generates light is installed or not. The active type display emits light without using the back light unit for thereby displaying a certain character or symbol. As the active type display unit, there are known a cathode ray tube, a light emitting device (LED), and others.

I have found that components of a liquid crystal display related to a lamp could be improved. Efforts have been made to improve and facilitate methods such as lamp insertion, lamp exchange, and lamp connection.

Exemplars of recent efforts in the art include the following five Japan patent publications: Hei 11-52368, Hei 6-273765, Hei 8-43816, Hei 9-5744, and Hei 8-211389.

While these recent efforts provide advantages, I note that they fail to adequately provide an improved efficient and convenient system for exchanging a lamp of a liquid crystal display.

SUMMARY OF THE INVENTION

Accordingly, it is an object of the present invention to provide a system for exchanging a lamp of a liquid crystal display which is capable of easily exchanging a lamp of a liquid crystal display.

It is a further object of the present invention to provide an improved system for exchanging a lamp of a liquid crystal display which enables a user to conveniently and efficiently exchange a lamp of a liquid crystal display.

To achieve the above objects and others, there is provided a system for exchanging a lamp of a liquid crystal display which includes a printed circuit board (PCB), a liquid crystal display panel electrically connected with the printed circuit board for thereby displaying a certain character or symbol and having at least one rectangular hole inwardly formed at a lateral surface of the same, a lamp detachably engaged to the rectangular hole of the liquid crystal display panel for emitting light on a screen of the liquid crystal display panel, a panel bracket for integrally fixing the liquid crystal display panel and the printed circuit board, and a cover tiltably engaged at a rim portion of the panel bracket and tilted in the forward and backward directions by a tilting member for thereby opening and closing the rectangular hole of the liquid crystal display panel when the liquid crystal display panel is integrally engaged to the panel bracket, whereby it is possible to easily exchange the lamp by tilting the cover in the forward and backward directions.

The panel bracket includes an opening at an intermediate portion of the same and is formed in a plate shape having rim portions, and a groove having a certain depth is formed in the upper rim portion, so that the cover is engaged to the groove.

The cover is formed in a L-shape, and the lower portion of the vertical portion of the same is tiltably hinged at the groove of the panel bracket by the tilting member, and the horizontal portion of the same opens and closes the upper surface of the liquid crystal display panel.

The tilting member includes an upper plate and a lower plate which are hinged, and the upper plate is engaged to the lower portion of the vertical portion, and the lower plate is engaged to the upper portion of the upper rim portion of the panel bracket.

An elastic plate having a certain elastic force is attached at a lateral portion of the head portion of the lamp, and when the lamp is inserted into the rectangular hole of the liquid crystal display panel, the elastic plate is pressed by an inner surface of the rectangular hole, so that the lamp is fixed to the liquid crystal display panel. The elastic plate is made of a rubber.

A slanted surface is formed on an inner surface of the rectangular hole, so that the head portion of the lamp is easily detachable from the rectangular hole.

To achieve these and other objects in accordance with the principles of the present invention, as embodied and broadly described, the present invention provides an apparatus, comprising: a printed circuit board; a liquid crystal display panel being electrically connected with said printed circuit board, displaying at least one symbol selected from among a plurality of symbols, having a side surface forming a hole; a lamp being removably inserted into the hole and detachably engaging a surface surrounding the hole, said lamp emitting light; a bracket being secured to said panel and said printed circuit board, said bracket having a top edge; and a cover being rotatably mounted to said bracket at said top edge of said bracket, being rotated in a forward direction away from the hole to a first position not covering the hole, being rotated in a backward direction toward the hole to a second position covering the hole, said cover being adjacent to the hole formed by said panel; said lamp being removed from the hole and inserted into the hole when said cover is rotated to said first position not covering the hole.

To achieve these and other objects in accordance with the principles of the present invention, as embodied and broadly described, the present invention provides an apparatus, comprising: a liquid crystal display panel displaying at least one symbol selected from among a plurality of symbols, having a side surface forming a hole; a lamp being removably inserted into the hole and detachably engaging a surface surrounding the hole, said lamp emitting light; a bracket being secured to said panel, said bracket having a top edge; and a cover being rotatably mounted to said bracket at said top edge of said bracket, being rotated in a forward direction away from the hole to a first position not covering the hole, being rotated in a backward direction toward the hole to a second position covering the hole, said cover being adjacent to the hole formed by said panel; said lamp being removed from the hole and inserted into the hole when said cover is rotated to said first position not covering the hole.

To achieve these and other objects in accordance with the principles of the present invention, as embodied and broadly described, the present invention provides an apparatus, comprising: a panel displaying at least one symbol selected from among a plurality of symbols, having a side surface forming a hole; a lamp being removably inserted into the hole and detachably engaging a surface surrounding the hole, said lamp emitting light; a bracket being secured to said panel, said bracket having a top edge; and a cover being rotatably mounted to said bracket at said top edge of said bracket, being rotated in a forward direction away from the hole to a first position not covering the hole, being rotated in a backward direction toward the hole to a second position covering the hole, said cover being adjacent to the hole formed by said panel; said lamp being removed from the hole and inserted into the hole when said cover is rotated to said first position not covering the hole.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A liquid crystal display monitor can be classified into an active type display and a passive type display based on whether a back light unit which generates light is installed or not. The active type display emits light without using the back light unit for thereby displaying a certain character or symbol.

The passive type display emits light using the back light unit for thereby displaying a certain character or symbol. The passive type display is classified into an upright type and an edge light type based on an installation position of a lamp of the back light unit.

In the case of the upright type, the lamp is installed at a rear portion of the liquid crystal display panel from an upward direction to a downward direction. A light spreading plate and a light reflection plate are installed at the front and rear portions of the lamp, so that a light is directly outputted onto a screen of the liquid crystal display panel.

In the edge light type, the lamp is installed on a lateral surface of the liquid crystal display panel, so that the light emitted from the lamp is inputted into a light guide plate and is outputted onto a screen of the liquid crystal display panel through the light spreading plate.

Figure 1:
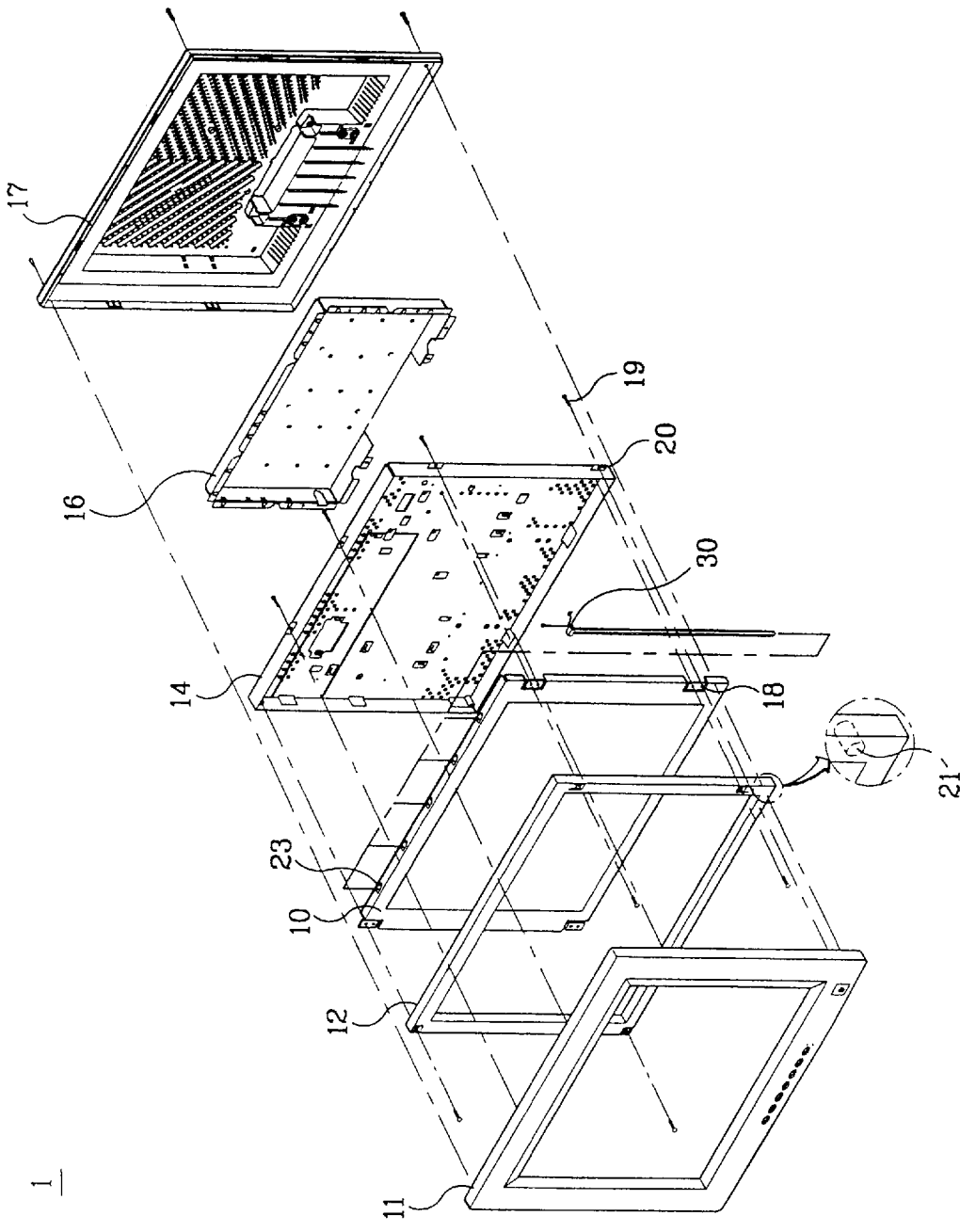
FIG. 1 is an exploded perspective view illustrating an inner construction of a liquid crystal display apparatus.
Figure 2:
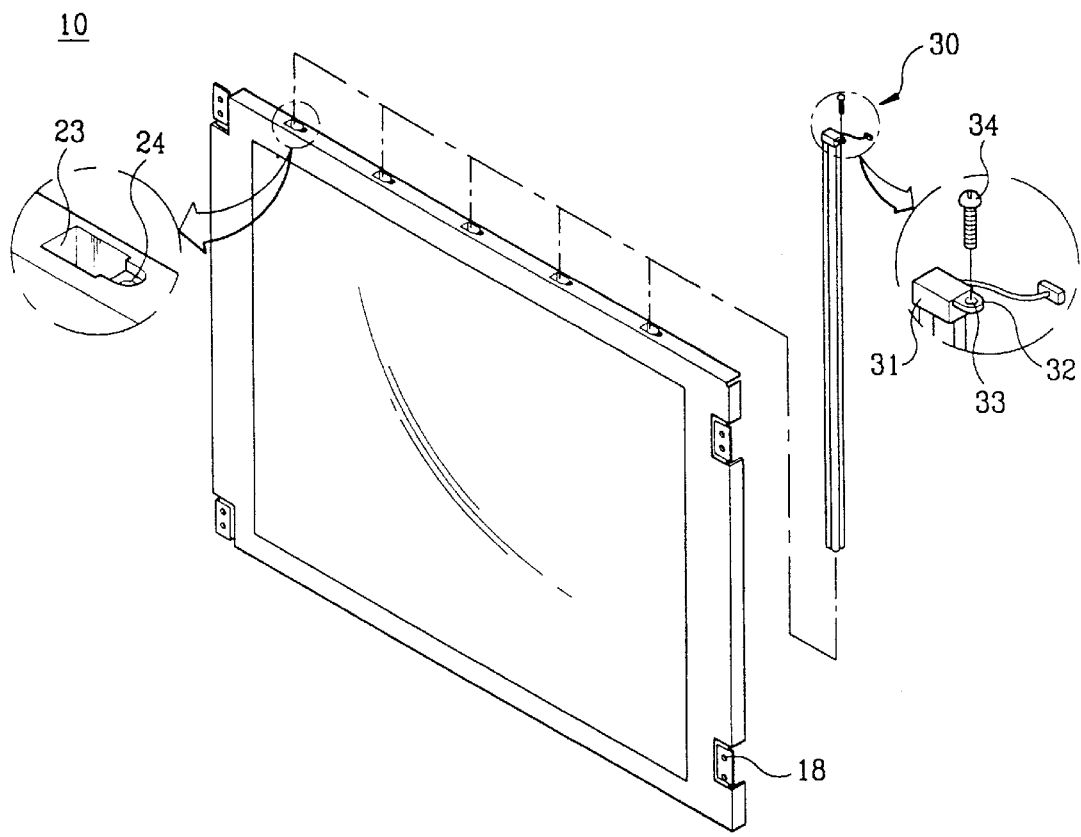
FIG. 2 is a perspective view illustrating a liquid crystal display panel having a lamp engaged therein.

FIG. 1 is an exploded perspective view illustrating an inner construction of a liquid crystal display apparatus in which the upright type back light unit is installed, and FIG. 2 is a view illustrating a state that the lamp is engaged to the liquid crystal display panel. As shown therein, a liquid crystal display (LCD) apparatus 1 includes a front casing 11, a liquid crystal display panel 10 for displaying a certain character or symbol, a panel bracket 12 for fixing the liquid crystal display panel 10, a printed circuit board (PCB) 14 for electronically controlling the liquid crystal display as apparatus 1, an electronic wave shield plate 16 for shielding an electronic wave generated by the liquid crystal display panel 10, and a rear casing 17 integrally engaged to a rear portion of the front casing 11 for thereby forming an outer structure of the system.

A liquid crystal display panel can be used in a portable computer or in other devices displaying varying visual information. A portable computer can be a hand-held computer, a laptop computer, a notebook computer, or a desktop replacement computer. Liquid crystal display panels can be used in a television, a portable video recorder, a desktop computer, a calculator, a mobile telephone, a watch, a display panel of a printer displaying status information, and in other applications requiring a display of information.

A first through hole 18 is formed at each corner portion of the liquid crystal display panel 10. A second through hole 20 is formed at each corner portion of the printed circuit board 14. The above-described first through holes 18 and the second through holes 20 are corresponded with each other. In addition, a stud 21 is backwardly protruded from each rear side corner portion of the panel bracket 12. Therefore, an engaging screw 19 is engaged to the stud 21 of the panel bracket 12 through the second and first through holes 20 and 18, so that the panel bracket 12, the liquid crystal display panel 10, and the printed circuit board 14 are engaged with each other.

The back light lamp 30 is detachably engaged at an upper portion of the liquid crystal display panel 10. Namely, a plurality of rectangular holes 23 are formed on an upper surface of the liquid crystal display panel 10. The lamp 30 is engaged to the rectangular hole 23. In addition, a bracket 32 having a screw hole 33 formed therein is protruded at one side of a head portion 31 of the lamp 30. Therefore, the engaging screw 34 is engaged to the engaging hole 24 formed on an upper surface of the liquid crystal display panel 10 through the screw hole 33, so that the lamp 30 is integrally engaged to the liquid crystal display panel 10.

When the lamp 30 is engaged to the liquid crystal display panel 10, the lamp 30 is electrically connected with an inverter printed circuit board, so that the lamp 30 emits light, and the light is outputted onto a screen of the liquid crystal display panel 10 from the backward direction.

However, in the above-described liquid crystal display apparatus shown in FIGS. 1 and 2, when exchanging the lamp, the engaging screws engaged to each corner portion of the panel bracket are disengaged, and the liquid crystal display panel is separated from the panel bracket, and the engaging screws which fix the lamp are disengaged, and then the lamp is removed to the outside. Therefore, the procedure for exchanging the lamp is complicated, and the time required for exchanging the lamp is increased.

Figure 3:
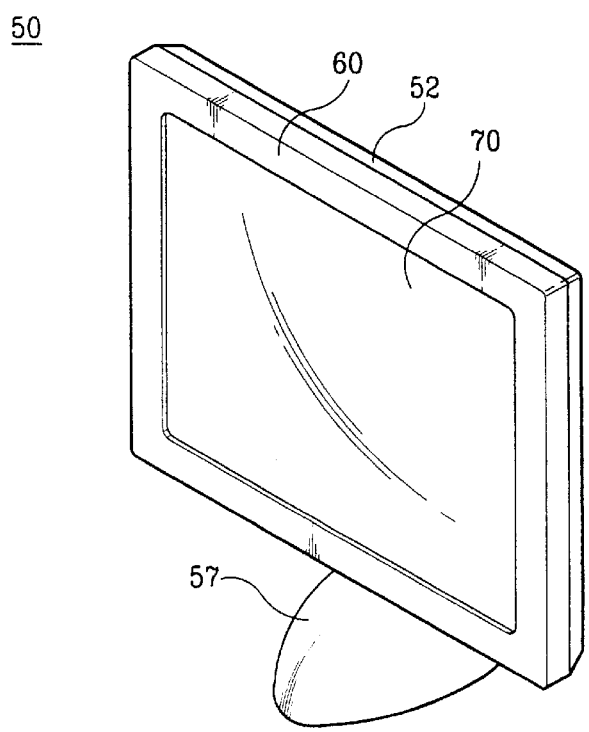
FIG. 3 is a perspective view illustrating a liquid crystal display apparatus, in accordance with the principles of the present invention.
Figure 4:
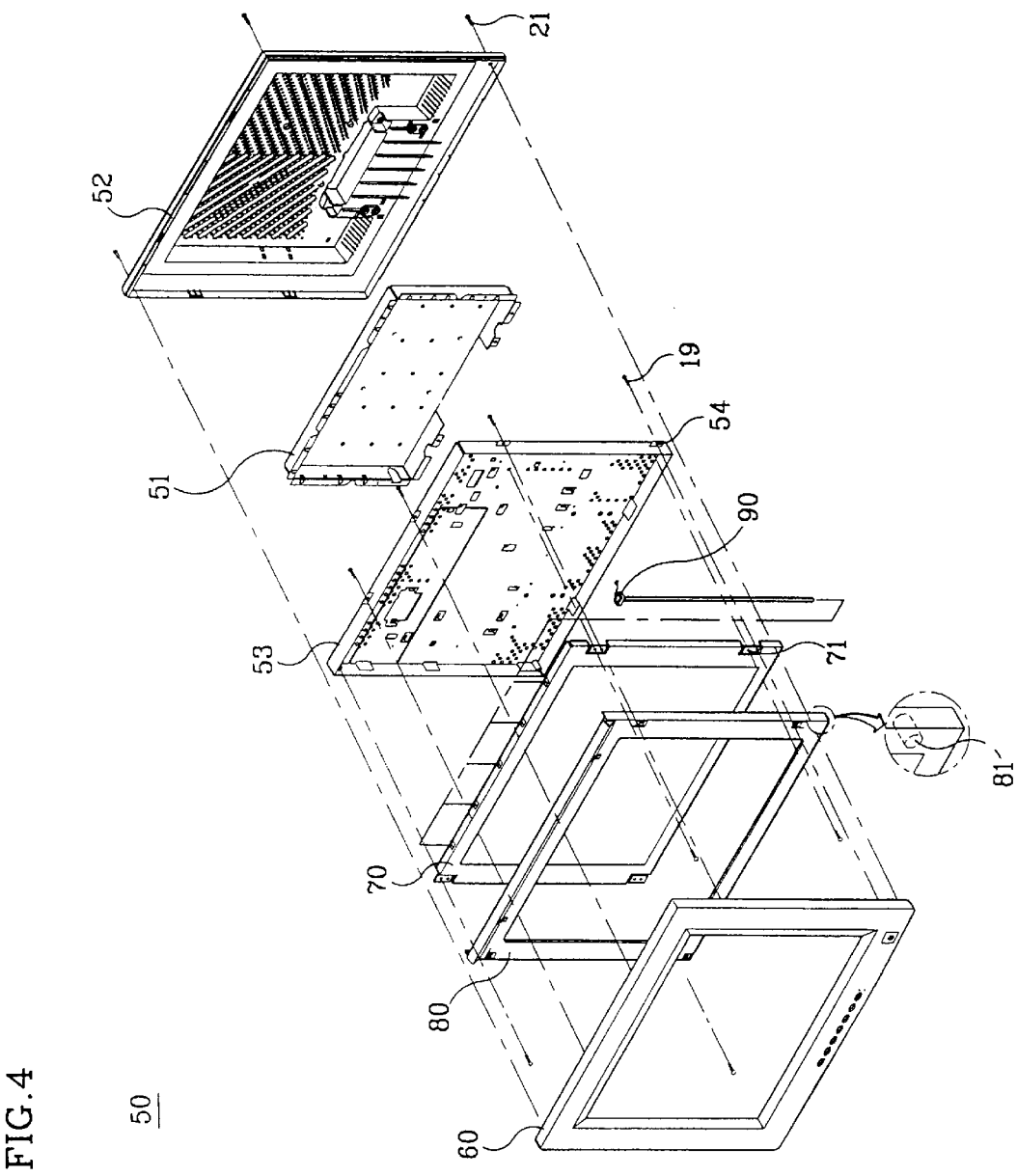
FIG. 4 is a perspective view illustrating an inner construction of a liquid crystal display apparatus, in accordance with the principles of the present invention.

The embodiments of the present invention will be explained with reference to the accompanying drawings FIGS. 3 through 8. FIG. 3 is a perspective view illustrating a liquid crystal display apparatus, in accordance with the principles of the present invention. FIG. 4 is a perspective view illustrating an inner construction of a liquid crystal display apparatus, in accordance with the principles of the present invention.

As shown in FIGS. 3 and 4, a liquid crystal display apparatus 50 includes a liquid crystal display panel 70 for displaying a certain character or symbol, a panel bracket 80 for fixing the liquid to crystal display panel 70, a printed circuit board (PCB) 53 for electronically controlling the liquid crystal display apparatus 50, an electronic wave shield plate 51 for shielding the electronic waves generated by the liquid crystal display panel 70, a rear casing 52 integrally engaged to a rear surface of the front casing 60 for forming an outer structure of the system, and a stand 57 for supporting the liquid crystal display apparatus 50. Screw 21 holds rear casing 52 together with front casing 60.

In the above-described liquid crystal display apparatus 50, the liquid crystal display panel 70 is integrally engaged with the printed circuit board 53 and the panel bracket 80. Namely, a first through hole 71 is formed at both upper and lower edge portions of the liquid crystal display panel 70. A second through hole 54 is formed at both upper and lower edge portions of the printed circuit board 53. The first and second through holes 71 and 54 are corresponded with each other. In addition, a stud 81 is backwardly protruded at a rear surface of the panel bracket 80. Therefore, the engaging screw 19 is engaged to the stud 81 of the panel bracket 80 through the second and first through holes 54 and 71. Therefore, the liquid crystal display panel 70, the panel bracket 80, and the printed circuit board 53 are integrally engaged with other.

Figure 5:
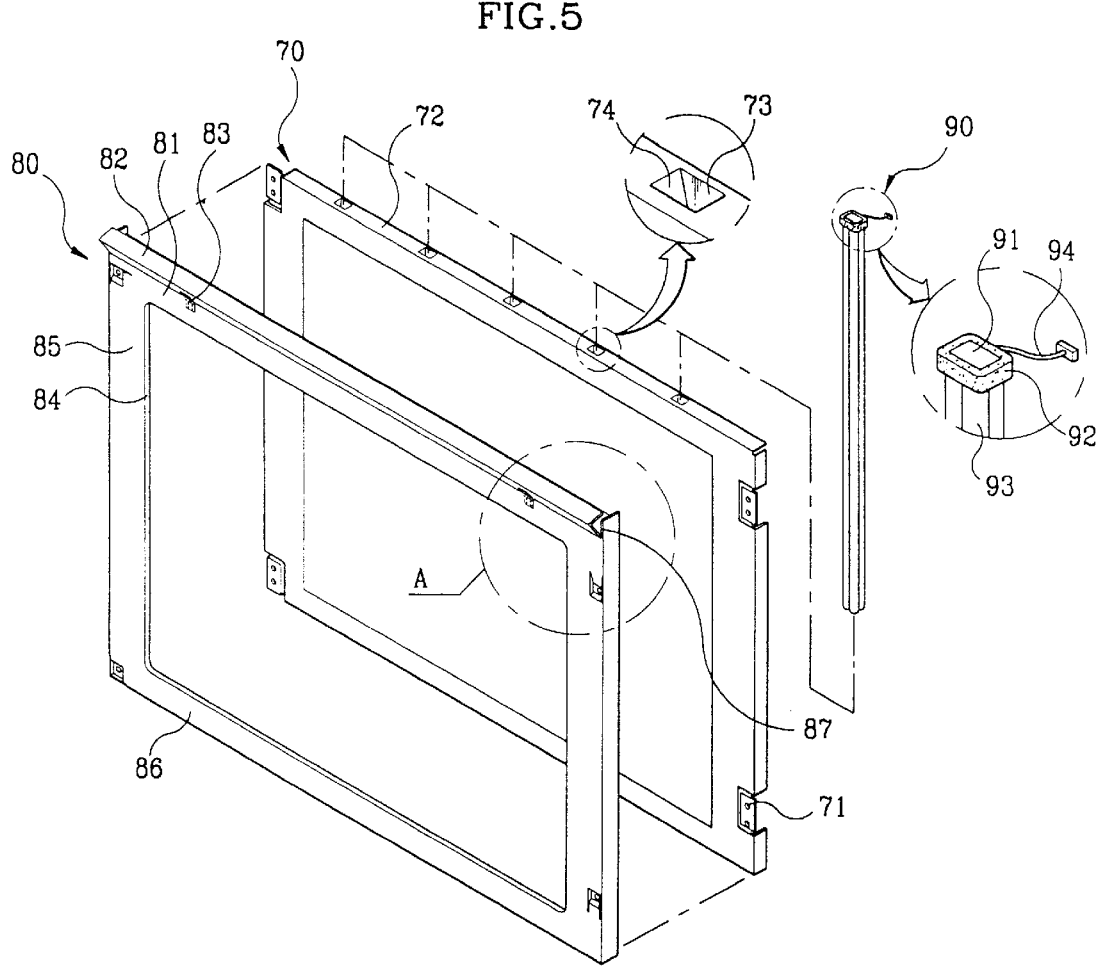
FIG. 5 is an exploded perspective view illustrating a state that a liquid crystal display panel having a lamp engaged therein is engaged with a panel bracket, in accordance with the principles of the present invention.

As shown in FIG. 5, a cover 82 covers an upper rim portion of the panel bracket 80 based on a tilting method by a tilting unit 83 in the forward and backward directions. The tilting unit 83 can be rotated in a forward direction and in a backward direction. Therefore, when exchanging the lamp 90 of the liquid crystal display panel 70, the cover 82 of the panel bracket 80 is removed for thereby exchanging the lamp 90. The above-described construction and operation will be explained in more detail with reference to FIGS. 5, 6 and 7.

Figure 6:
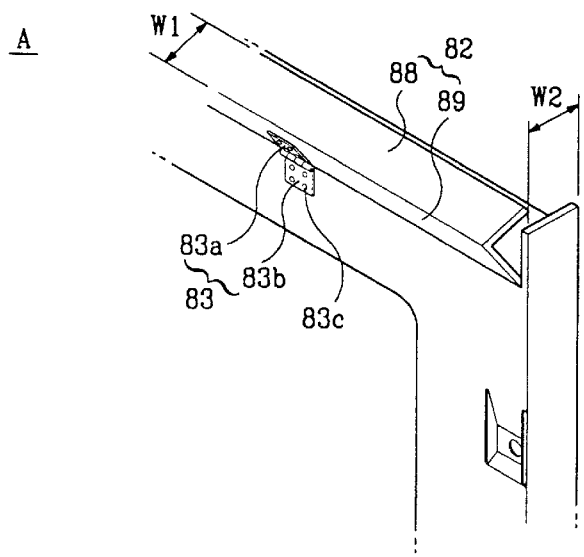
FIG. 6 is a partial enlarged view illustrating the portion "A" of FIG. 5, in accordance with the principles of the present invention.
Figure 7:
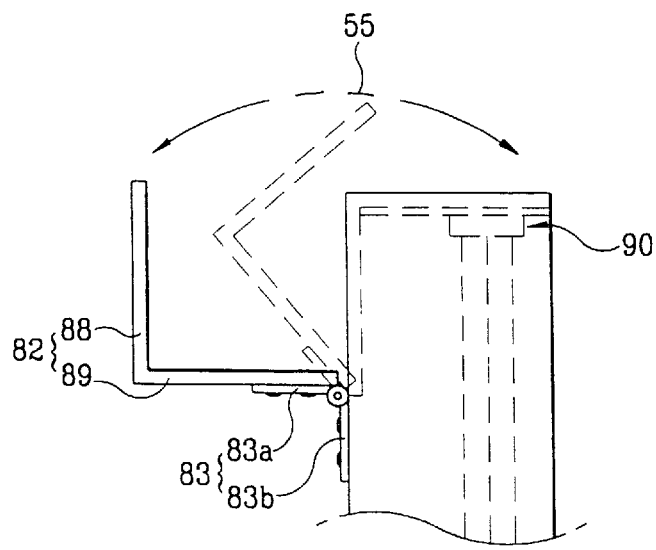
FIG. 7 is a view illustrating an operational state of a cover of a panel bracket of FIG. 5, in accordance with the principles of the present invention.

FIG. 5 is an exploded perspective view illustrating a state that a liquid crystal display panel having a lamp engaged therein is engaged with a panel bracket according to the present invention, FIG. 6 is a partial enlarged view illustrating the portion "A" of FIG. 5, and FIG. 7 is a view illustrating an operational state of a cover of a panel bracket of FIG. 5.

As shown therein, in the panel bracket 80, an opening 84 is formed at an intermediate portion of a rectangular plate, so that rim portions 81, 85 and 86 are formed. In addition, both side rim portions 85 and the lower rim portion 86 of the panel bracket 80 are bent in the backward direction, and in the upper rim portion 81, a groove having a certain depth is formed in the lower portion.

The cover 82 is tiltably fixed to the groove 87. The cover 82 is formed in an L-shape and includes a vertical portion 89 and a horizontal portion 88. The L-shape corresponds roughly to an elbow. The elbow in the cover 82, at the point where the vertical portion 89 and the horizontal portion 88 meet each other, can form a 90 degree angle. The vertical portion 89 is fixed to an upper rim portion 81 of the panel bracket 80 by at least one tilting portion 83, preferably, by two tilting portions 83.

The tilting portion 83 includes an upper plate 83a which is tilted based on a hinge method and a lower plate 83b. The upper plate 83a is engaged to a lower portion of the vertical portion 89, and the lower plate 83b is engaged to an upper portion of the upper rim portion 81. In addition, the upper and lower plates 83a and 83b are integrally engaged to the panel bracket 80 by the fixing pin 83c.

Therefore, the vertical portion 89 is hinged with respect to the panel bracket 80 in the forward and backward directions. The horizontal portion 88 has the same width W1 as the width W2 of the panel bracket 80. In addition, in the case that the cover 82 is upwardly rotated in the arrow direction 55, the horizontal portion 88 covers the upper surface 72 of the liquid crystal display panel 70. Therefore, the lamp 90 is easily exchanged by opening and closing the cover 82.

A plurality of rectangular holes 73, preferably five rectangular holes 73, are formed on the upper surface 72 of the liquid crystal display panel 70. The back light lamp 90 is engaged in the rectangular holes 73.

The lamp 90 includes a hexagonal head portion, a light emitting portion 93 protruded from the lower portion of the head portion 91, and a connector 94 for supplying an electric power to the light emitting portion 93.

A rubber plate 92 having a certain elastic force is attached on the lateral surface of the head portion 91. Therefore, when engaging the lamp 90 to the rectangular holes 73 of the liquid crystal display panel 70, the rubber plate 92 is elastically pressed and inserted into the rectangular holes 73. At this time, the rectangular hole 73 has a slanted surface 74 which is slanted in the inner direction, so that the lamp 90 is easily inserted.

When the lamp 90 is inserted into the rectangular hole 73, the pressed state of the rubber plate 92 is released, and the rubber plate 92 contacts with an inner surface of the rectangular hole 73, so that the lamp 90 is fixed at the rectangular hole 73. Therefore, the lamp 90 is fixed to the liquid crystal display panel 70 without using an additional engaging member.

Figure 8:
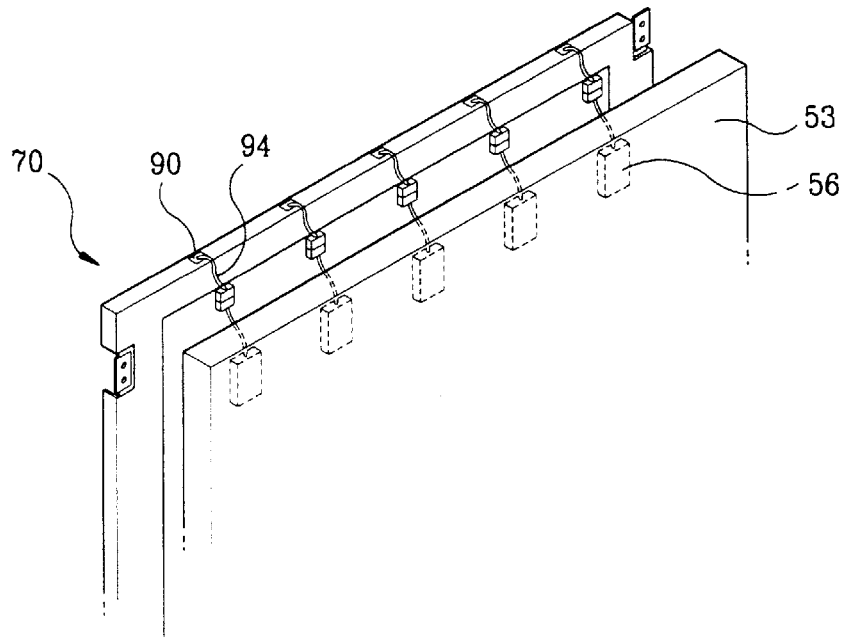
FIG. 8 is a view illustrating a state that a lamp is integrally engaged to an inverter printed circuit board, in accordance with the principles of the present invention.

As shown in FIG. 8, the lamp 90 is engaged to the liquid crystal display panel 70, and then the connector 94 of the lamp 90 is electrically engaged to the inverter printed circuit board 56 of the printed circuit board 53. Therefore, an external power is supplied through the inverter printed circuit board 56, so that light is emitted from the light emitting unit 93 of FIG. 5.

In another embodiment of the present invention, a rectangular hole is formed on a lateral surface and lower surface of the liquid crystal display panel, so that the lamp is detachable at a lateral side and lower side of the liquid crystal display apparatus.

The lamp exchanging operation of the liquid crystal display apparatus according to the present invention will be explained with reference to the accompanying drawings.

As shown in FIGS. 4 through 8, when exchanging the lamp 90, the cover 82 is moved in the arrow direction 55. At this time, since the tilting portion 83 is tilted, the cover 82 is opened in the forward direction.

When the cover 82 is opened, the connector 94 of the lamp 90 connected to the inverter printed circuit board 56 is separated. In addition, the lamp 90 is removed from the rectangular hole 73 of the liquid crystal display apparatus 50. Namely, the rubber plate 92 attached at the head portion 91 of the lamp 90 is pressed, and a friction contact state with the inner surface of the rectangular hole 73 is released, so that the lamp 90 is removed to the outside. Therefore, the lamp 90 is removed from the liquid crystal display apparatus 50.

When the lamp 90 is removed to the outside, a new lamp 90 is engaged into the rectangular hole 73 of the liquid crystal display panel 70. Namely, the rubber plate 92 attached at the head portion 91 of the lamp 90 is pressed and inserted into the rectangular hole 73. Therefore, the pressed state of the rubber plate 92 is released, and the rubber plate 92 contacts with the inner surface of the rectangular hole 73. Therefore, the lamp 90 is stably fixed to the liquid crystal display apparatus 50 without using an additional engaging member.

When the lamp 90 is engaged to the liquid crystal display apparatus 50, the cover 82 is opened in the arrow direction 55, so that the upper portion of the panel bracket 80 is covered. Therefore, the lamp 90 emits light onto the screen of the liquid crystal display panel from the backward direction.

As described above, in the system for exchanging the lamp of the liquid crystal display apparatus according to the present invention, the cover is tiltably engaged with respect to the panel bracket for thereby opening and closing the lamp engaging portion, so that the lamp is easily exchanged by opening and closing the cover. Therefore, it is possible to easily exchange the lamp, and the time required for exchanging the lamp is decreased.

In addition, the rubber plate is attached to the lamp, so that the rubber plate has a friction contact with the rectangular hole of the liquid crystal display panel. Therefore, it is possible to stably fix the lamp to the liquid crystal display panel without using an additional engaging member.

Although the preferred embodiments of the present invention have been disclosed for illustrative purposes, those skilled in the art will appreciate that various modifications, additions and substitutions are possible, without departing from the scope and spirit of the invention as recited in the accompanying claims.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:

a printed circuit board;

a liquid crystal display panel being electrically connected with said printed circuit board, displaying at least one symbol selected from among a plurality of symbols, having a side surface forming a hole;

a lamp being removably inserted into the hole and detachably engaging a surface surrounding the hole, said lamp emitting light;

a bracket being secured to said panel and said printed circuit board, said bracket having a top edge; and a cover being rotatably mounted to said bracket at said top edge of said bracket, being rotated in a forward direction away from the hole to a first position not covering the hole, being rotated in a backward direction toward the hole to a second position covering the hole, said cover being adjacent to the hole formed by said panel;

said lamp being removed from the hole and inserted into the hole when said cover is rotated to said first position not covering the hole.

2. The apparatus of claim 1, said apparatus corresponding to a liquid crystal display panel apparatus.

3. The apparatus of claim 1, said lamp being removably inserted into the hole formed by said panel corresponding to a plurality of lamps being removably inserted into a respective plurality of holes formed by said panel.

4. The apparatus of claim 1, said bracket integrally securing said panel with said printed circuit board.

5. The apparatus of claim 1, further comprising:

a tilting unit rotatably coupling said cover to said bracket; and said cover having a front side and a top side, said tilting unit being secured to said front side of said cover and being secured to said top edge of said bracket.

6. The apparatus of claim 5, said tilting unit further comprising:

an upper plate being secured to said front side of said cover; and a lower plate being secured to said top edge of said bracket, said upper plate being hingedly coupled to said lower plate.

7. The apparatus of claim 1, said lamp further comprising:

an elastic unit having an elastic force, said elastic unit securing said lamp to said panel when said lamp is inserted into the hole.

8. The apparatus of claim 1, said lamp further comprising:

an elastic unit having an elastic force, said elastic unit being pressed by said surface of said panel surrounding the hole when said lamp is inserted into the hole.

9. The apparatus of claim 8, said lamp including a head portion being attached to said elastic unit.

10. An apparatus, comprising:

a liquid crystal display panel displaying at least one symbol selected from among a plurality of symbols, having a side surface forming a hole;

a lamp being removably inserted into the hole and detachably engaging a surface surrounding the hole, said lamp emitting light;

a bracket being secured to said panel, said bracket having a top edge; and a cover being rotatably mounted to said bracket at said top edge of said bracket, being rotated in a forward direction away from the hole to a first position not covering the hole, being rotated in a backward direction toward the hole to a second position covering the hole, said cover being adjacent to the hole formed by said panel;

said lamp being removed from the hole and inserted into the hole when said cover is rotated to said first position not covering the hole.

11. The apparatus of claim 10, said lamp being removably inserted into the hole formed by said panel corresponding to a plurality of lamps being removably inserted into a respective plurality of holes formed by said panel.

12. The apparatus of claim 10, further comprising:

a tilting unit rotatably coupling said cover to said bracket; and said cover having a front side and a top side, said tilting unit being secured to said front side of said cover and being secured to said top edge of said bracket.

13. The apparatus of claim 12, said tilting unit further comprising:

an upper plate being secured to said front side of said cover; and a lower plate being secured to said top edge of said bracket, said upper plate being hingedly coupled to said lower plate.

14. The apparatus of claim 10, said lamp further comprising:

an elastic unit having an elastic force, said elastic unit securing said lamp to said panel when said lamp is inserted into the hole.

15. The apparatus of claim 10, said lamp further comprising:

an elastic unit having an elastic force, said elastic unit being pressed by said surface of said panel surrounding the hole when said lamp is inserted into the hole.

16. An apparatus, comprising:

a panel displaying at least one symbol selected from among a plurality of symbols, having a side surface forming a hole;

a lamp being removably inserted into the hole and detachably engaging a surface surrounding the hole, said lamp emitting light;

a bracket being secured to said panel, said bracket having a top edge; and a cover being rotatably mounted to said bracket at said top edge of said bracket, being rotated in a forward direction away from the hole to a first position not covering the hole, being rotated in a backward direction toward the hole to a second position covering the hole, said cover being adjacent to the hole formed by said panel;

said lamp being removed from the hole and inserted into the hole when said cover is rotated to said first position not covering the hole.

17. The apparatus of claim 16, further comprising:

a tilting unit rotatably coupling said cover to said bracket; and said cover having a front side and atop side, said tilting unit being secured to said front side of said cover and being secured to said top edge of said bracket.

18. The apparatus of claim 17, said tilting unit further comprising:

an upper plate being secured to said front side of said cover; and a lower plate being secured to said top edge of said bracket, said upper plate being hingedly coupled to said lower plate.

19. The apparatus of claim 18, said lamp further comprising:

an elastic unit having an elastic force, said elastic unit securing said lamp to said panel when said lamp is inserted into the hole, said elastic unit being pressed by said surface surrounding the hole when said lamp is inserted into the hole.

20. The apparatus of claim 19, said apparatus corresponding to a liquid crystal display device for a portable display unit, said panel displaying varying visual information to a user.

* * * * *